United States Patent [19]
Jacob, Jr.

[11] Patent Number: 6,047,953
[45] Date of Patent: Apr. 11, 2000

[54] DIAPHRAGM COMPRESSION RESTRAINER

[76] Inventor: Eugene W. Jacob, Jr., 3962 Abella St., Glendale, Calif. 91214-2319

[21] Appl. No.: 09/300,246

[22] Filed: Apr. 27, 1999

[51] Int. Cl.$^7$ ....................................................... F16K 7/12
[52] U.S. Cl. .......................... 251/331; 92/98 R; 92/103 F
[58] Field of Search ................................. 251/331, 61.1, 251/61.2, 335.2; 92/98 R, 103 F

[56] References Cited

U.S. PATENT DOCUMENTS

| | | | |
|---|---|---|---|
| 1,836,976 | 12/1931 | Krause | 92/103 F X |
| 3,113,592 | 12/1963 | Mercier | 92/103 F X |
| 5,222,523 | 6/1993 | Trimble | 251/331 X |

*Primary Examiner*—Kevin Lee
*Attorney, Agent, or Firm*—Maria Erlinda C. Sarno

[57] ABSTRACT

A universal diaphragm made of elastomeric material having rigid solid compression restrainers incorporated within the diaphragm for preventing overcompression of the diaphragm during the assembly of a diaphragm valve. The compression restrainers can be designed to occupy several positions within the area of the diaphragm that is pressed between the bonnet and valve body of the diaphragm valve. The compression restrainers are bonded or vulcanized onto the surface of the elastomeric material making up the diaphragm.

7 Claims, 7 Drawing Sheets

DIAPHRAGM COMPRESSION RESTRAINER

BACKGROUND

This invention relates to a solid rigid restraining device bonded to a diaphragm to control the compression exerted upon the diaphragm.

The diaphragm of this invention is commonly used with weir type diaphragm valves, although other usage employing diaphragms are not precluded. Weir type diaphragm valves are particularly suited for processing high purity fluids used in the pharmaceutical, biotechnical, chemical, food and semiconductor industries. This is due to the exceptional ability of weir type valves to resist damage from the action of the fluids because only the diaphragm comes in contact with the fluid while the other parts of the valve are isolated unless the diaphragm is ruptured. However, weir type diaphragm valves experience a major drawback in that diaphragms require periodic replacement, whose cost and maintenance have to be figured in or budgeted. The diaphragm is sandwiched between the bonnet and the valve body of a diaphragm valve which are joined to each other by fasteners. Because the diaphragm is made of a flexible material, it offers minimal resistance to the force exerted in tightening the fasteners. Further, a user, in his/her desire to ensure closure of the resulting chamber between the bonnet and the valve body, has a tendency to overtighten the fasteners to prevent leakage of the fluid from the chamber. Due to this, diaphragms either deform or rupture, causing the frequent replacement.

The above problem is encountered during the assembly of the diaphragm valve. This should be differentiated from deformation and rupture of the diaphragm that are caused by the excessive force applied on the diaphragm during the actual usage of the valve, when the bottom surface of the diaphragm is compressed on the top surface of a weir, which movements prevent the flow of the liquid to and from the chamber. This latter problem is addressed by Fritz Muller in U.S. Pat. No. 5,377,956 which proposes the installation of an additional screw nut to limit the movement of the valve stem, which drives a compressor device that pushes the diaphragm to the surface of the weir. In U.S. Pat. No. 3,250,511, this problem is addressed by incorporating a detachable retainer ring clamped between the valve bonnet and the valve body which establishes a positive stop for the compressor device, referred to therein as the actuator. Other means such as the use of a backing sheet of a yieldable polymeric material or a metallic diaphragm internally bonded with the elastomeric diaphragm to form a composite two layered diaphragm were also proposed to solve the same problems which are encountered during the actual operation of the diaphragm valve.

None of the above means address the prevention of excessive force imposed upon the diaphragm during the fastening of the valve body with the bonnet connected to a diaphragm which is the main aspect addressed by the claimed invention. U.S. Pat. No. 3,628,770 proposes the use of a plate member intermediate between the bonnet and the diaphragm with a central opening defined by a rigid outwardly flared edge to protect the surface of the diaphragm from the sharp corners, burrs or irregularities on the bonnet which can damage the diaphragm while allowing the free flexing of the diaphragm as it closes and opens to control the flow of the fluid. While this invention also addresses the problem encountered during the actual operation of the diaphragm valve, it can to some extent, also minimize the compression on the diaphragm during its assembly. The device, however, requires a mechanical modification on the design and construction of a diaphragm valve amounting to purchasing and replacing the diaphragm valves currently in use. Further, since the flexible material making up the diaphragm is still in direct contact with the valve body, although shielded from the bonnet, there is still a possibility to overcompress the diaphragm sandwiched between these components.

The claimed invention, on the other hand, prevents excessive compression of the diaphragm and by directing the modification only at the construction of the diaphragm, it can be used with all existing varieties of diaphragm valves.

It is an object of this invention to provide a diaphragm having a bonded solid rigid material, referred to as compression restrainer, on an area adjacent to fasteners connecting the bonnet and the valve body together, to prevent overcompression of the periphery of the diaphragm during the assembly of a diaphragm valve.

It is also an object of this invention to provide a diaphragm with a compression restrainer that can be applied to any diaphragm valve thereby allowing the use of enlisting diaphragm valves.

It is a further object of this invention to provide a diaphragm with the compression restrainer that is inexpensive and whose usage significantly reduces the necessity for frequent replacement of the diaphragms.

It is still a further object of this invention to provide a diaphragm that can prevent loosening of the interconnection of the parts of a diaphragm valve during its actual operation.

SUMMARY OF THE INVENTION

The present invention prevents overcompression of the diaphragm when it is fastened between a bonnet and a valve body. The diaphragm is connected to one end of the bonnet facing the valve body and this together with the valve body encloses a chamber through which a fluid flows. It is important for the resulting chamber to be free from leakage which is achieved by pressing the peripheral edges of the diaphragm, the bonnet and the valve body together. The peripheral edges of the diaphragm are the flat surfaces surrounding the dome shaped portion of the diaphragm. While a right amount of force on the diaphragm is ideal, excessive force is harmful. Overcompression causes damage, distortion and even rupture of the diaphragm. Fasteners used to assemble the bonnet, diaphragm and valve body are usually threaded screws and closure is achieved by tacitly sensing resistance to additional turning of the fasteners. Because the diaphragm is of a flexible material, there is no suitable means of determining when just the right amount of stress or force has been applied. The tendency to overcompress is frequent because of the natural disposition to insure that liquids do not leak out of the enclosed chamber during the operation of the valve. Diaphragm valve and valve are used interchangeably herein.

The diaphragm of this invention comprises a dome shaped elastomeric material having a top surface, a bottom surface, peripheral edges having a hole for accommodating a fastener, a connector on the top surface for engaging to a compressor within a bonnet of a diaphragm valve, and a solid rigid material bonded within selected areas of the peripheral edges.

DETAILED DESCRIPTION OF THE INVENTION

Figure 1:
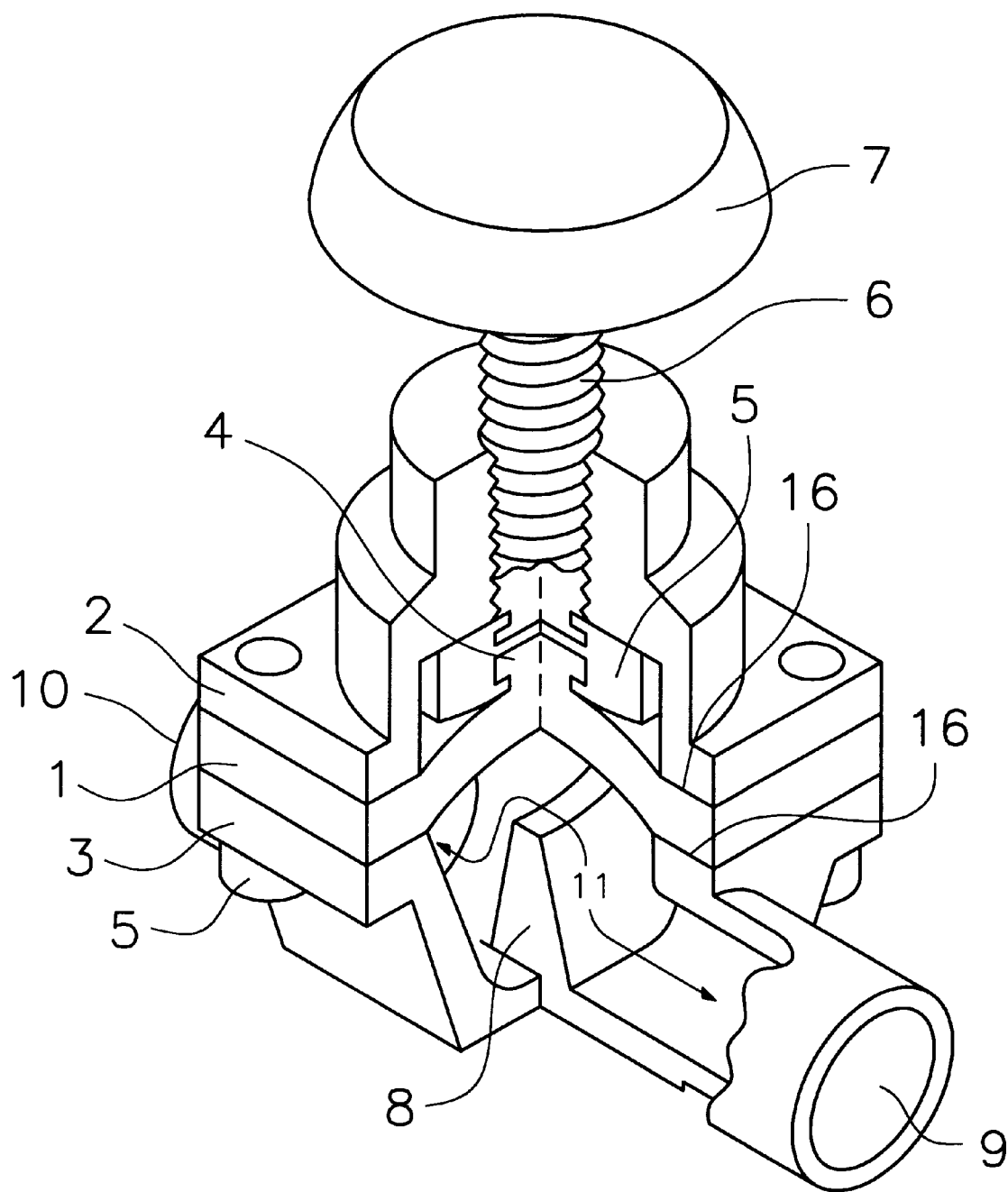
FIG. 1 shows a conventional weir type diaphragm valve.

A brief description of a weir type diaphragm valve is presented to aid in defining the scope of the invention. A weir type diaphragm valve as shown in FIG. 1, has for its main components or parts, a diaphragm 1 situated between a bonnet 2 and a valve body 3. The diaphragm 1 is connected to one side of the bonnet 2 by a connector 4 which is in turn connected to a diaphragm actuator assembly generally comprising a compressor 5 with one end connected to the diaphragm 1 through the connector 4 and the other end connected to a stem 6 whose up and down motion caused by the turning of a handle 7 connected to the stem 6 controls the position of the diaphragm 1 in relation to the weir 8 of the diaphragm valve. The weir 8 is disposed intermediate and transversely of an inlet 9 and an outlet 10 port of a through passage 11 of the valve body 3 wherein the fluid flows. The through passage 11 is a chamber created when the bonnet, diaphragm and valve body are fastened together. The connector 4 is the molded head of and integral to the diaphragm 1 to fit a tee slot in the compressor 5 or alternately, the connector 4 is a screw that is molded into the diaphragm and threads into the compressor 5.

Figure 2:
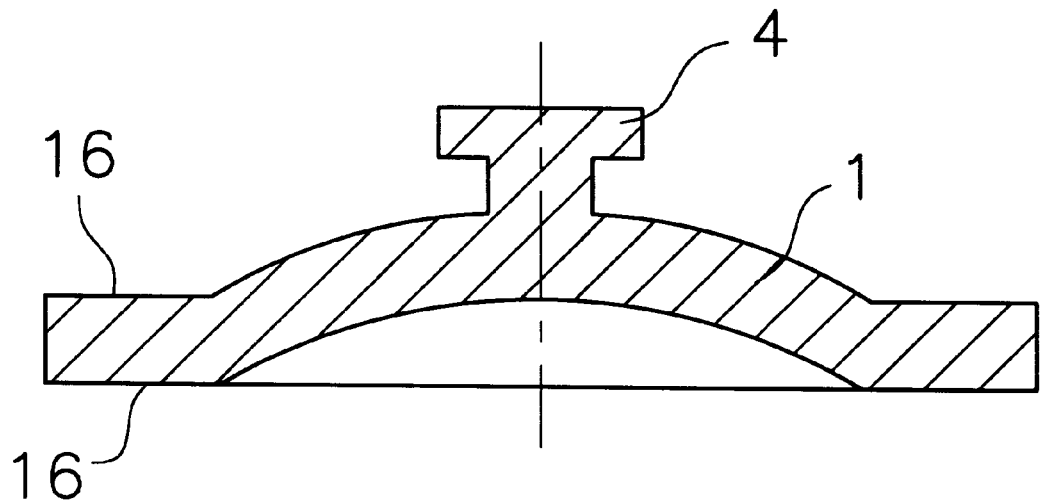
FIG. 2 are cross sectional views of two conventional diaphragms.
Figure 2:
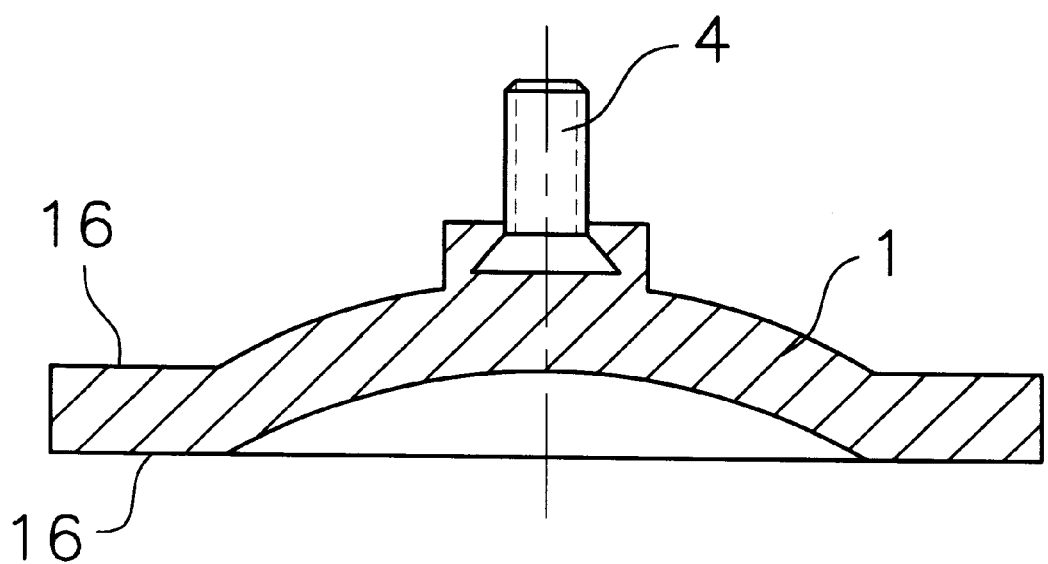
Figure 3:
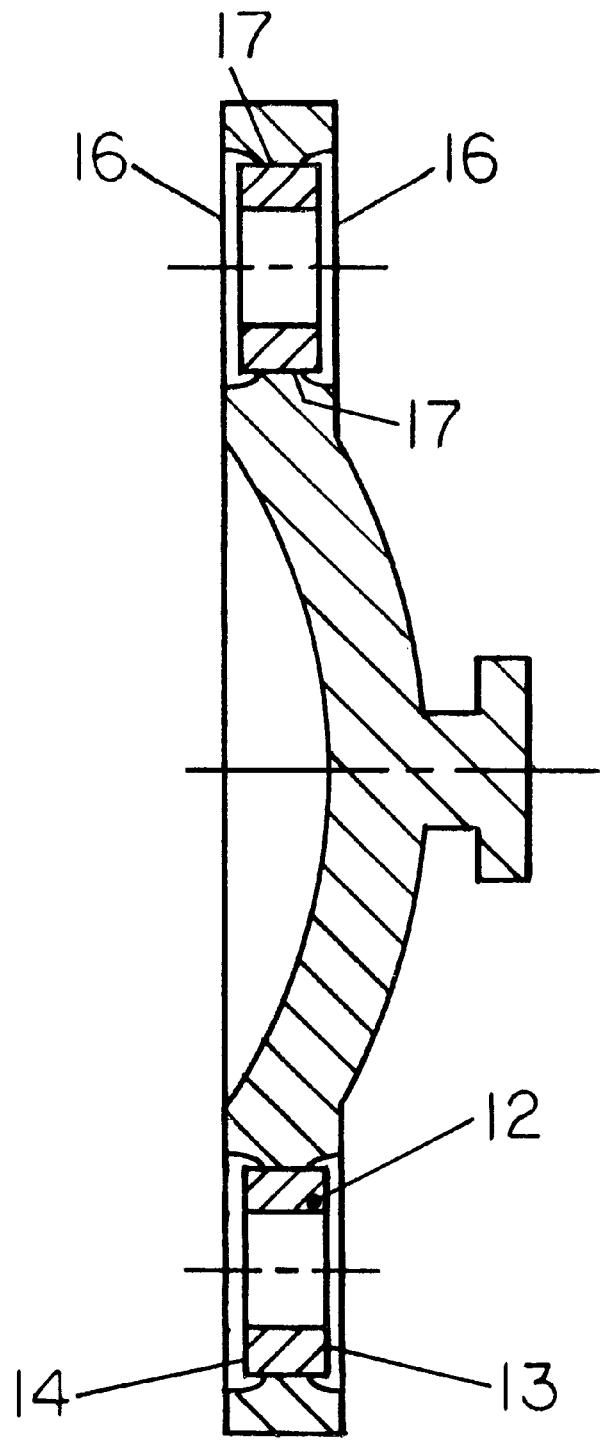
FIG. 3 is a cross sectional view of a diaphragm with rigid compression restrainers bonded to the elastomeric material surrounding the holes for accommodating fasteners on the peripheral edges of the diaphragm.
Figure 4:
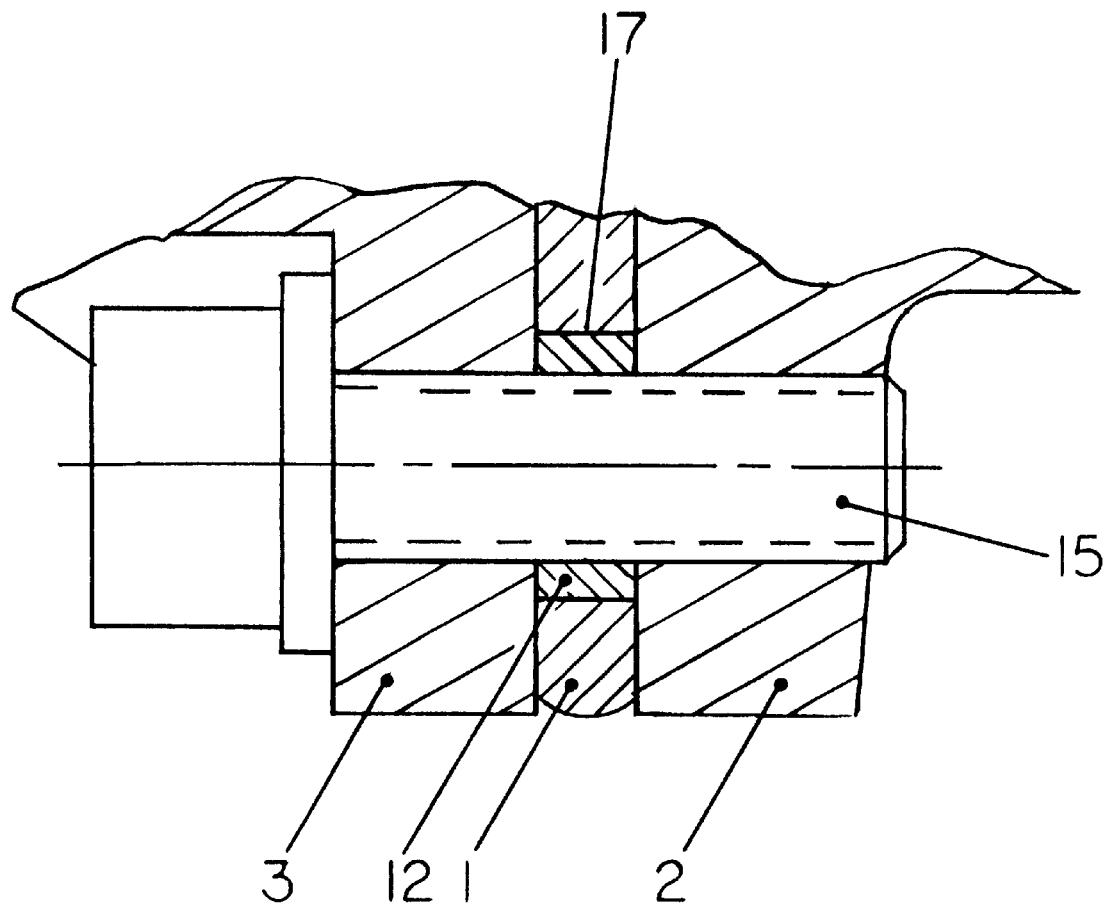
FIG. 4 is an isolated view of a fastener through a diaphragm with a compression restrainer surrounding the fastener.
Figure 5:
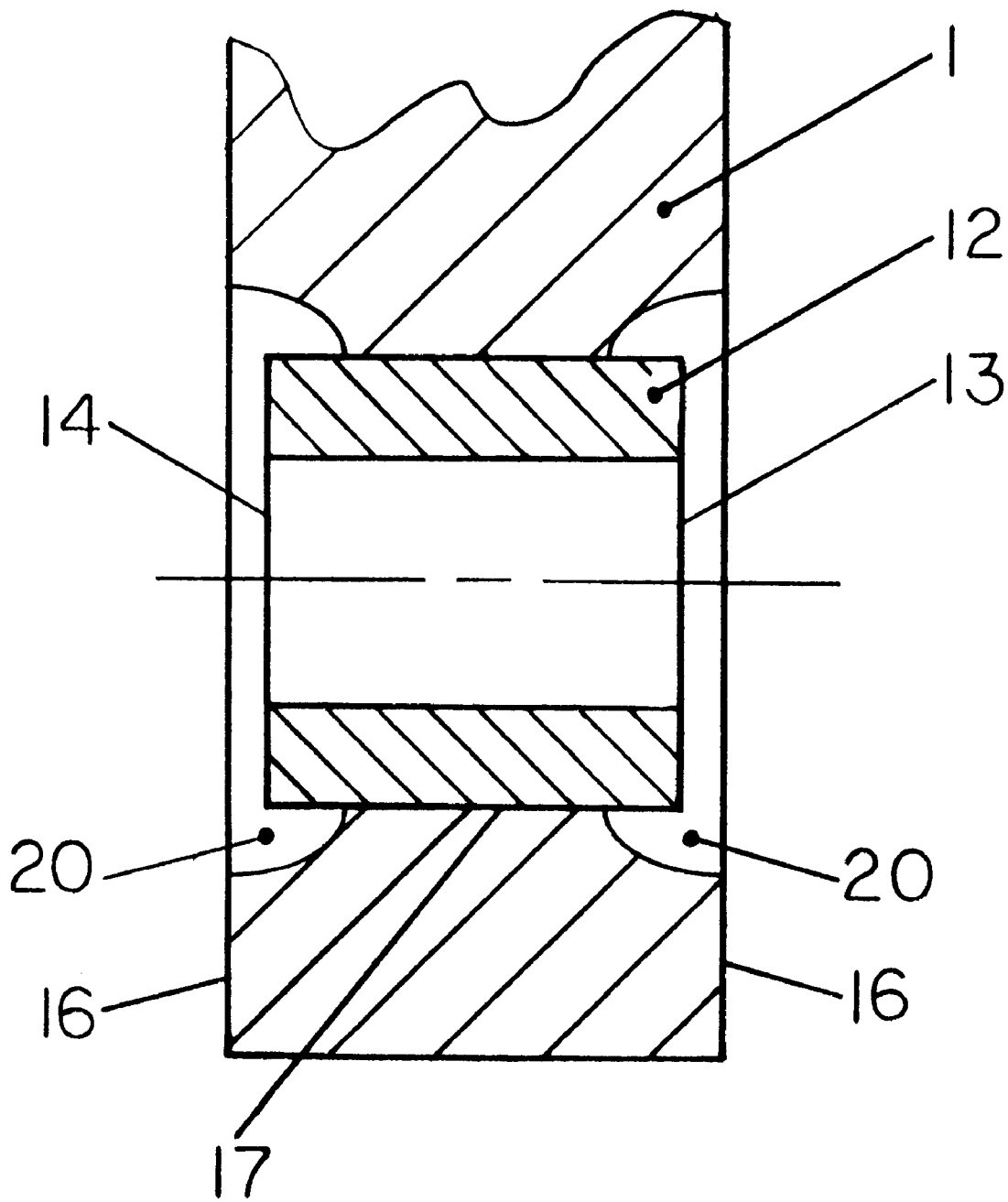
FIG. 5 is an isolated cross sectional view of a compression restrainer.

Conventional diaphragms are shown in FIG. 2. Diaphragms are usually made of flexible elastomeric materials such as rubber, neoprene, Hycar, chlorobutyl, urethane, silicone, and ethylene propylene or a plastic such as polytetrafluoroethylene. The improvement of the present invention as shown in FIG. 3, is the incorporation of a compression restrainer 12 within the construction of a diaphragm. Modifying only the diaphragm obviates the necessity of replacing or redesigning the whole diaphragm valve and still achieve the objects of the invention. The compression restrainer 12 is made of solid rigid materials such as metals, preferably those that do not rust, and rigid plastic materials such as acetal and ULTEM. The compression restrainer should stand excessive force exerted on the bonnet 2 and the valve body 3 without itself deforming and rupturing. Excessive force means a force that will overstrain, deform, damage or rupture a diaphragm. When the bonnet 2 and the valve body 3 contacts the top 13 and bottom surface 14, respectively, of the compression restrainer 12, further tightening of the fasteners 15 connecting the bonnet 2 and the valve body 3 does not further compress the diaphragm. The height or the thickness of the compression restrainer 12 controls the level of compression exerted on the portion or area of the diaphragm 1 that is pressed between the bonnet and the valve body which in FIG. 4 is shown to surround the compression restrainer 12. The area of the diaphragm 1 pressed between the bonnet 2 and the valve body 3 is also referred to as peripheral edges 16 of the diaphragm. To assure a seal over operational and environmental extremes, the thickness of the compression restrainer 12 is slightly less than that of the diaphragm as shown in FIG. 5. The peripheral edges 16 of the diaphragm incorporating the compression restrainer, protrude at both the top 13 and bottom 14 surface of the compression restrainer as shown in FIG. 5. When the bonnet 2 and the valve body 3 contact the compression restrainer 12, the peripheral edges 16 of the diaphragm 1 are compressed to the same level as top surface 13 and the bottom surface 14 of the compression restrainer. The peripheral edges 16 can range from 105% to 140% in overall thickness compared to the compression restrainer, which depend upon factors such as the material make up of the diaphragm, the size of the diaphragm valve, the configuration of the weir, pressure and temperature extremes. With this design, the inclusion of the compression restrainers within the diaphragm assembly, all the coupled parts, the bonnet, diaphragm and valve body, are rigidly connected because they can be torqued to the proper tightness by the fasteners 15, thereby assuring that the parts will not be loosened by subsequent operation or vibration of the diaphragm valve. Loosened fasteners during the actual operation of the diaphragm valve can cause leakage, which can also lead to product contamination, necessitating system shut down and/or repair. This is another common problem not addressed by weir-type diaphragm valves without compression restrainers.

Figure 6A:
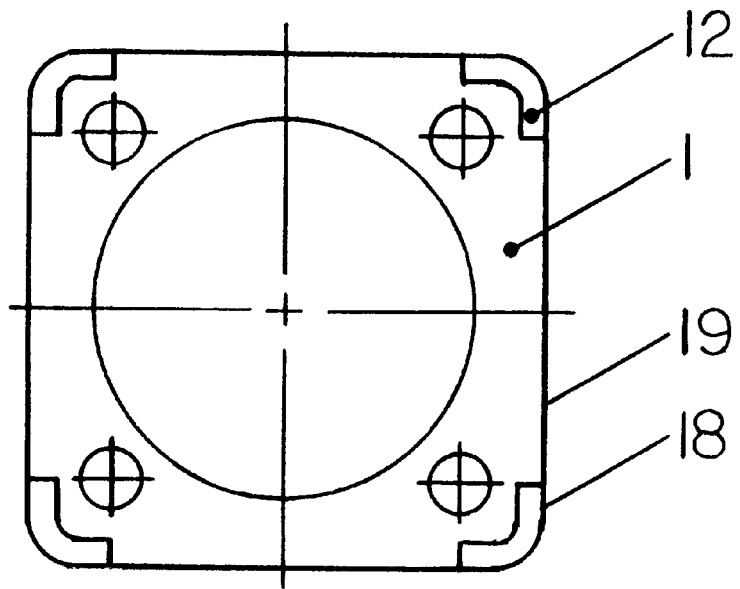
FIGS. 6A and 6B are plan views showing alternate positions of the compression restrainer relative to the peripheral edges of the diaphragm.
Figure 6B:
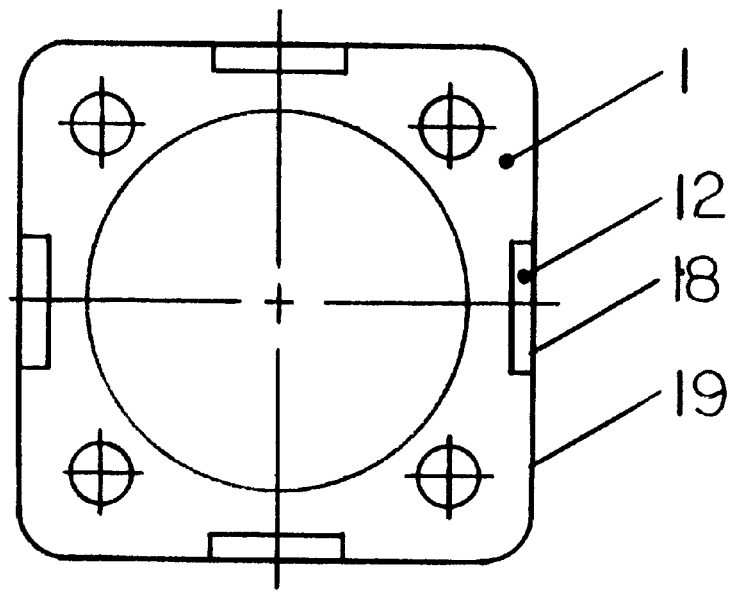
Figure 7:
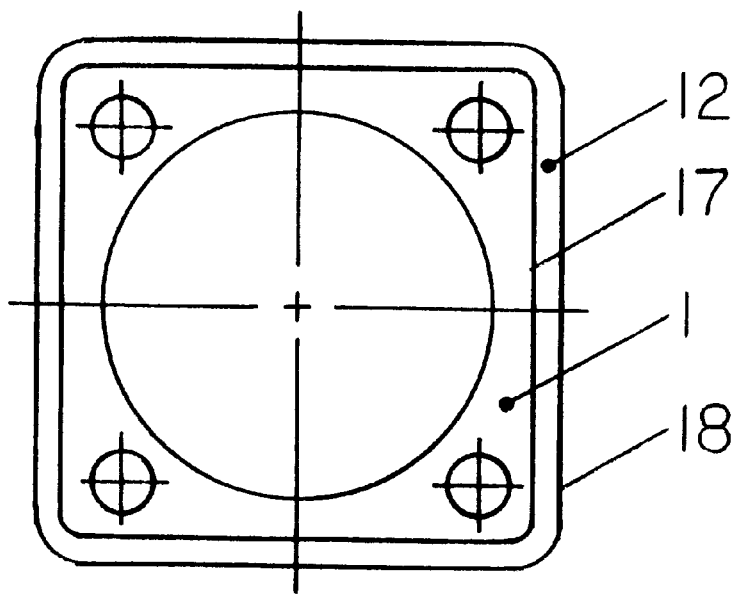
FIG. 7 is a plan view showing a compression restrainer surrounding the peripheral edges of the diaphragm.
Figure 8:
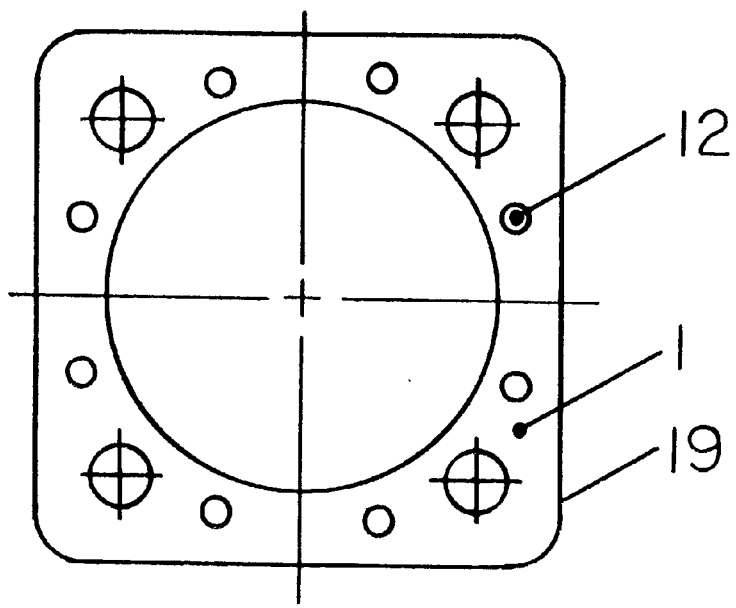
FIG. 8 is a plan view of a plurality of compression restrainers on selected locations of the peripheral edges of the diaphragm.

The compression restrainer 12 although illustrated in FIG. 4 as surrounding the holes through which the fastener passes, may be designed in many different ways so long as these restrainers are placed within the peripheral edges or areas 16 of the diaphragm that are pressed between the bonnet and the valve body during the assembly of the valve. FIGS. 3, 4, 6A, 6B, 7 and 8, although not comprehensive, show some of the designs which work equally well. The compression restrainers 12 as shown in FIGS. 4 and 5 are constructed with the peripheral edges 16 of the diaphragm surrounding its contact surfaces 17. However, a design having some sides 17 of the compression restrainer in contact with the diaphragm with some sides free, such as placing unbonded sides 18 in line with the outer edges 19 of the diaphragm as shown in FIGS. 6A, and 6B and consequently, with the outside edges of the bonnet and the valve body, will also function similarly. A compression restrainer 12 can also totally surround a diaphragm as shown in FIG. 7. The compression restrainer 12 can also be a plurality of solid rigid material incorporated anywhere within the peripheral edges 16 of the diaphragm 1. In FIG. 8, the compression restrainer 12 is cylindrical in shape but any other geometric shape can be adopted.

These diaphragms can be made in any size, with varying thickness, to conform with the size and shape of the bonnet and valve body of the diaphragm valve and its usage.

The compression restrainer 12 is incorporated into a diaphragm by conventional bonding processes which involves the application of a primer or bonding agent on the contact surfaces 17 of the compression restrainer 12 prior to placing this on a mold. The contact surfaces of the compression restrainers means all the surfaces that will be bonded to the elastomeric material of the diaphragm 1. The mold is filled with uncured elastomer after the compression restrainers 12 are placed in the mold, which when heated causes the elastomer to stick to the primed contact surfaces 17 of the compression restrainer. The mold used for this invention leaves the opposing top 13 and bottom 14 surfaces of the compression restrainer 12 free from elastomeric material. This bonding process is also referred to as vulcanization of the elastomeric material onto the metal. Examples of primers and bonding agents are various grades of CHEMLOK. The resulting bond can accommodate the force applied on the diaphragm without causing the compression restrainer to break loose from the diaphragm, although a compression restrainer, even if it gets loose after the assembly of the valve and proper tightening of the fastener, will not adversely affect the operation of the valve. Sufficient space 20 around the compression restrainer is left unfilled with bonding material and the elastomer making up the diaphragm, as shown in FIG. 5, to accommodate the flattening of the diaphragm when pressed, without the diaphragm running over the e posed unbonded top 13 and bottom 14 surfaces of the compression restrainer as shown in FIG. 4. The dimensions of the space 20 are controlled by the design of the mold which is in turn dictated by the amount of elastomer overrunning on the sides of the diaphragm 1 when flattened.

While the embodiment of the present invention has been described, it should be understood that various changes, adaptations, and modifications may be made therein without departing from the spirit of the invention and the scope of the claims.

I claim:

1. A diaphragm, comprising:
   a dome shaped elastomeric material having a top surface, a bottom surface, peripheral edges having a hole for accommodating a fastener;
   a connector on the top surface for engaging to a compressor within a bonnet of a diaphragm valve; and,
   a solid rigid material bonded within selected areas of the peripheral edges.

2. The diaphragm of claim 1 wherein the selected areas of the peripheral edges are areas of the diaphragm that are pressed between a bonnet and a valve body during assembly of a diaphragm valve.

3. The diaphragm of claim 1 wherein the solid rigid material is selected from the group consisting of metals and rigid plastic material.

4. The diaphragm of claim 1 wherein the solid rigid material has an overall thickness less than that of the peripheral edges of the diaphragm.

5. The diaphragm of claim 4 wherein the thickness of the solid rigid material controls the level of compression exerted on the diaphragm during assembly of a diaphragm valve.

6. The diaphragm of claim 4 wherein the overall thickness of the diaphragm is 105% to 140% of the solid rigid material.

7. A diaphragm requiring less periodic replacement by preventing rupture and deformation of the diaphragm caused by excessive compression on the diaphragm during assembly of a diaphragm valve, comprising:
   a dome shaped elastomeric material having a top surface, a bottom surface, peripheral edges having a hole for accommodating a fastener;
   a connector on the top surface for engaging to a compressor within a bonnet of a diaphragm valve; and
   a solid rigid material bonded within selected areas of the diaphragm that are pressed between a bonnet and a valve body during assembly of the diaphragm valve.

\* \* \* \* \*